(12) United States Patent
Shibata et al.

(10) Patent No.: US 7,069,332 B2
(45) Date of Patent: Jun. 27, 2006

(54) VIDEO SERVER FOR VIDEO DISTRIBUTION SYSTEM

(75) Inventors: Koichi Shibata, Kamakura (JP); Masaru Igawa, Kawasaki (JP); Koichi Morita, Yamato (JP); Shuichi Sakamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 764 days.

(21) Appl. No.: 09/739,691

(22) Filed: Dec. 20, 2000

(65) Prior Publication Data

US 2001/0018772 A1    Aug. 30, 2001

(30) Foreign Application Priority Data

Feb. 24, 2000    (JP)    ............................. 2000-046997

(51) Int. Cl.
  *G06F 15/16* (2006.01)
(52) U.S. Cl. ...................... 709/231; 709/203; 709/204; 709/219; 709/223; 709/226; 709/230; 725/91; 725/93; 725/94; 725/114
(58) Field of Classification Search ................ 709/231, 709/230, 223, 226, 219, 203, 204; 725/82, 725/87, 91, 92, 94, 145, 93, 114
See application file for complete search history.

(56) References Cited

U.S. PATENT DOCUMENTS

| 5,583,995 | A | 12/1996 | Gardner et al. |
| 6,014,694 | A | 1/2000 | Aharoni et al. |
| 6,356,947 | B1 * | 3/2002 | Lutterschmidt ............. 709/231 |
| 6,658,476 | B1 | 12/2003 | Van |
| 6,714,549 | B1 * | 3/2004 | Phaltankar .................. 370/397 |
| 6,760,749 | B1 * | 7/2004 | Dunlap et al. .............. 709/204 |
| 2001/0025378 | A1 | 9/2001 | Sakamoto et al. |
| 2002/0049977 | A1 * | 4/2002 | Miller et al. .................. 725/82 |

FOREIGN PATENT DOCUMENTS

| JP | 09282247 | 10/1997 |
| JP | 10154110 | 6/1998 |

OTHER PUBLICATIONS

Chapter 12: Splitting Live Presentations; http://service.real.com/help/library/guides/g270/htmfiles/spliting.htm, Sep. 14, 2000, pp. 1-13.

T. Yozo, "Making Native Multicast Campus Network", Information Processing Society of Japan, Working paper vol. 99, No. 44, May 21, 1999, pp. 31-35 (English translation).

* cited by examiner

*Primary Examiner*—Yves Dalencourt
(74) *Attorney, Agent, or Firm*—Mattingly, Stanger, Malur & Brundidge, P.C.

(57) ABSTRACT

A video server for distributing a digitized video content includes a unit for determining whether or not a video content requested from a terminal is stored in the video server, a unit for issuing a transmission request to another server for transmitting the video thereto in accordance with the HTTP protocol when the video content requested from the terminal is not stored in the video server, and a unit for receiving the video content transmitted from the other video server in accordance with the HTTP protocol, and transmitting the video content to the terminal in accordance with IP multicast or HTTP protocol.

8 Claims, 8 Drawing Sheets

VIDEO SERVER FOR VIDEO DISTRIBUTION SYSTEM

CROSS-REFERENCE TO RELATED APPLICATION

This application relates to U.S. application Ser. No. 09/764,377 filed on Jan. 19, 2001 based on Japanese Application 2000-021977, and assigned to the present assignee. The content of that application is incorporated herein by reference.

BACKGROUND OF THE INVENTION

The present invention relates to a video server for transmitting a video signal in parallel to a plurality of locations using the Internet protocol, and more particularly, to a video server for a video distribution system which enables transmission of a video signal through a transmission path, which cannot use IP multicast, through protocol conversion.

Simultaneous transmission of a signal such as a video signal to multiple locations, utilizing a protocol such as the Internet protocol, is referred to as "multicast," and a number of methods for realizing the multicast have already been proposed, with some of such methods already brought into practical use. A representative one of these methods is the Internet multicast technology which has been published as a standard designated "RFC1112" of Internet Engineering Task Force (IETF).

A critical component of the multicast technology is a host group model. Multicast information is transmitted to a host group indicated by some multicast address, such that each of terminals attempting to share the multicast information receives the information addressed to the host group. In a network based on the Internet protocol, multicast information is accompanied by a "multicast address," used as a destination address, which indicates that the information is multicast.

Upon receiving multicast information, a device for controlling an information transmission path, i.e., a "router" reads its multicast address, and transmits the multicast information to a path to which a terminal belonging to an associated host group is connected. In this event, when a plurality of terminals belong to the associated host group and they are located on different paths, the router copies the information intended for transmission, and transmits the copies to the respective paths. This scheme allows for a large reduction in the amount of transmitted information, as compared with independent transmission of information from an origination to all terminals belonging to a host group.

However, the effectiveness of the multicast-based transmission is limited only to those paths which support the multicast from an origination to all terminals belonging to a host group. Additionally, in the current Internet environment, firewalls are installed everywhere as required for the security, preventing the Internet protocol information from freely passing therethrough.

The firewall refers to a device for examining information which is going to pass therethrough to block information other than that regarded as safe. Multicast information is generally blocked by the firewall. Therefore, a special setting is required for multicast information to pass through the firewall. However, it is quite difficult to pass multicast information through in the current Internet in which firewalls are installed everywhere and managed independently by different organizations.

Therefore, for transmitting the same video simultaneously to a plurality of terminals when firewalls are interposed between a video server and the terminals, the video is conventionally transmitted individually from the video server to each of the terminals. In this event, the amount of information transmitted from the video server to the terminals is increased in proportion to the number of receiving terminals, resulting in a problem of a higher transmission cost.

On the other hand, many of protocols for passing information through a firewall are inherently intended for file transfer, so that although they can transmit information without errors, they do not guarantee when the information will arrive at a particular terminal. Applications which require the multi-cast often involve real-time transmission such as transmission of video and audio contents. Therefore, a mechanism for matching the transmission rate between reception and transmission of video and audio contents is required for protocols which pass the information through firewalls.

SUMMARY OF THE INVENTION

It is an object of the present invention to provide a video server for a video distribution system which is capable of solving the above-mentioned problems, and transmitting the same video from a video server to a plurality of terminals utilizing the multi-cast to reduce the transmission cost even when firewalls are interposed between the video server and the terminals.

It is another object of the present invention to provide a mechanism for matching the transmission rate between reception and transmission in an asynchronous transmission network.

To achieve the above object, the present invention provides a video server for distributing a digitized video content, which includes a unit for determining whether or not a video content requested from a terminal is stored in the video server, a unit for transmitting a transmission request to another video server for transmitting the video content thereto in accordance with the HTTP (Hyper-Text Transfer Protocol) protocol when the video content requested by the terminal is not stored in the video server, and a unit for receiving the video content transmitted from the other video server in accordance with the HTTP protocol and transmitting the video content to the terminal in accordance with the IP multicast or the HTTP protocol.

The transmission unit further includes a plurality of buffers, a buffer selector, and a reference time generator. The transmission unit detects a random access point in image information, and stores the image information up to the next random access point in one of the plurality of buffers. The buffer selector selects, from among the plurality of buffers, image information which has not been transmitted and has a time stamp equal to or smaller than a reference time generated by the reference time generator, and indicates the selected image information to the transmission unit.

DESCRIPTION OF THE EMBODIMENTS (1) System Configuration

Figure 1:
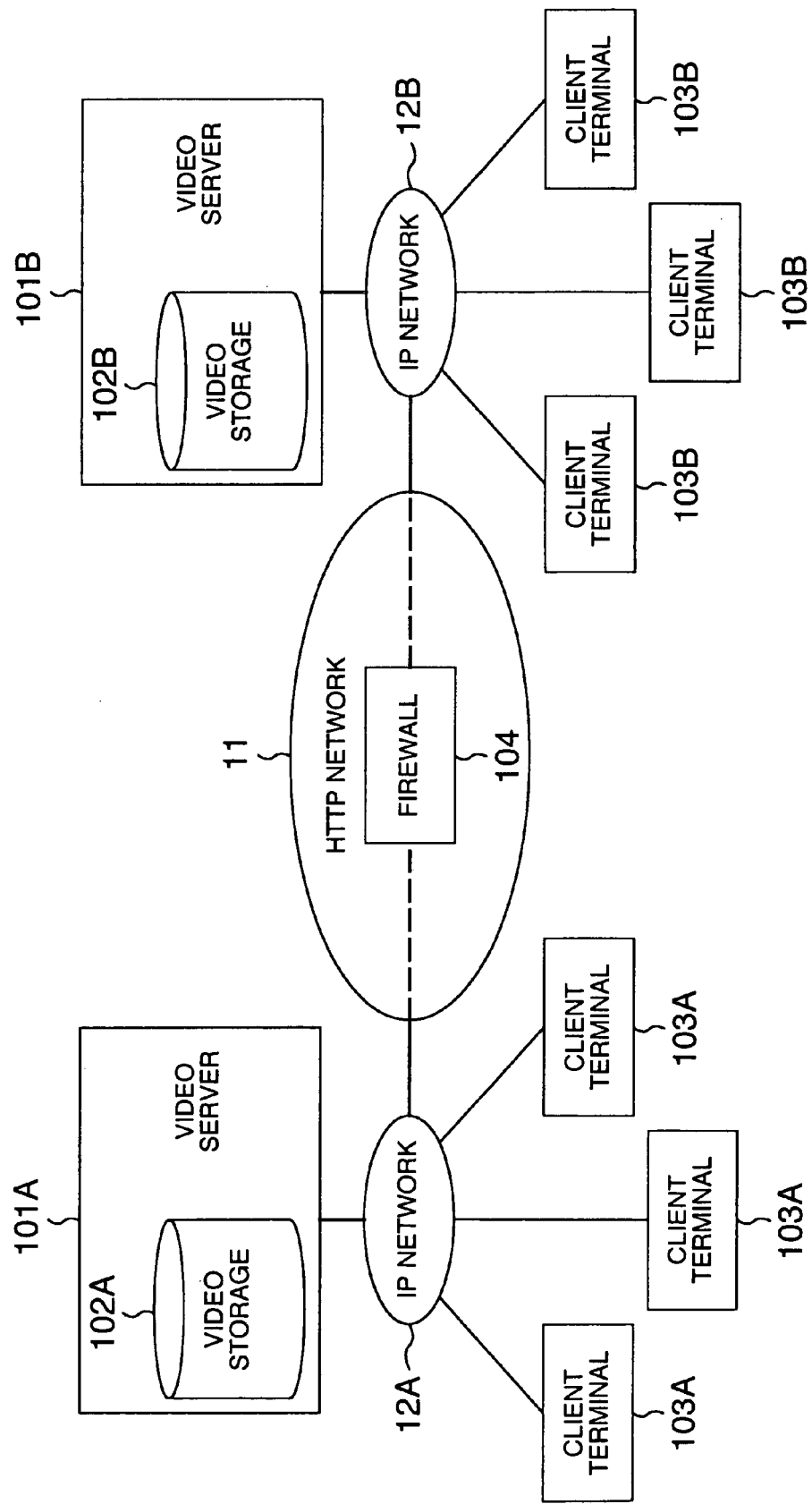
FIG. 1 is a block diagram illustrating an example of a video distribution system in which two video servers according to the present invention are connected through a transmission path which does not allow IP multicast to pass therethrough.

FIG. 1 illustrates an example of a video distribution system in which two video servers according to the present invention are connected through a transmission path which does not allow IP multicast to pass therethrough.

A video content stored in a video storage 102A of a video server 101A can be transmitted simultaneously to client terminals 103A through an IP network 12A using an IP multicast transmission scheme.

However, as to client terminals 103B connected to an IP network 12B, IP multicast based transmission cannot be realized from the video server 101A to the client terminal 103B, though connected to the network 12B, because a network connecting the IP network 12A and the IP network 12B has a firewall 104 interposed therebetween and serves as a network dedicated to HTTP.

To eliminate this inconvenience, the present invention transmits image information using the HTTP protocol only when the image information is passed through an HTTP network. For example, when an client terminal 103B requests to view a video content stored in the video storage 102A and multicast to the client terminals 103A, the video server 101A transmits image information to the client terminals 103A using the IP multicast, and simultaneously transmits the image information to the video server 101B through the HTTP network 11 using the HTTP protocol.

The video server 101B receives the image information transmitted from the video server 101A, and multicasts the image information to the client terminals 103B using the IP multicast.

A logical transmission path in accordance with the HTTP protocol between the video servers 101A and 101B is different from a logical transmission path in accordance with the IP multicast between the video server 101B and the client terminals 103B. The video server 101B manages the correspondence for both logical transmission paths and controls transmission/reception of image information.

Figure 2:
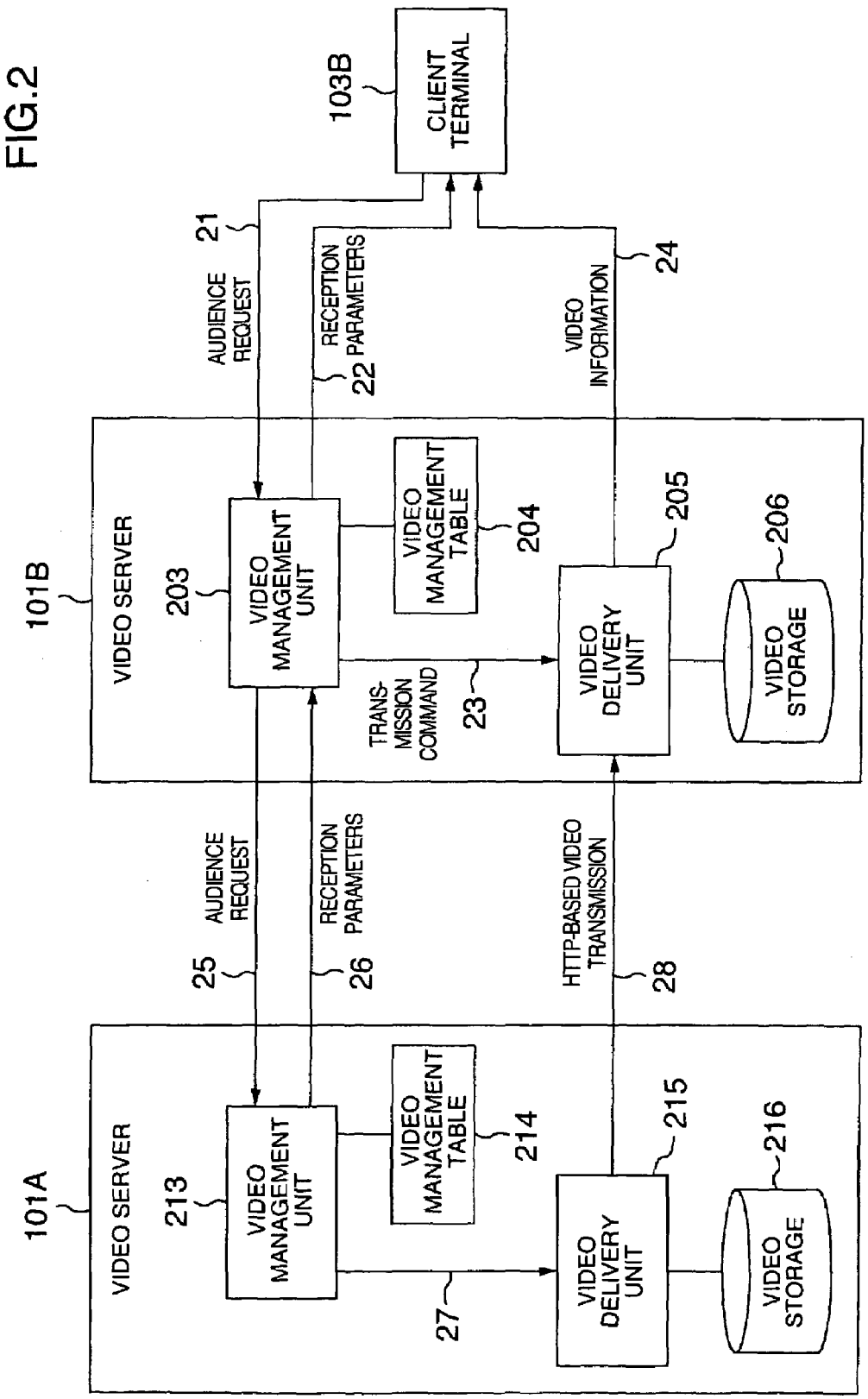
FIG. 2 is a flow diagram for explaining the operational flow of the video distribution system utilizing the video servers described in FIG. 1.

FIG. 2 is a diagram for explaining the operational flow of the video distribution system utilizing the video servers described in connection with FIG. 1. Here, explanation will be given of how a video content stored in a video storage 216 of a video server 101A is viewed on an client terminal 103B.

A video server 101B comprises a video management unit 203 and a video delivery unit 205. Image information is stored in a video storage 206, while identification information, attributes and so on for identifying the name and file of particular image information are managed by a video management table 204 which is referenced by the video management unit 203.

Similarly, the video server 101A comprises a video management unit 213 and a video delivery unit 215. Image information is stored in a video storage 216, while identification information, attributes and so on for identifying the name and file of particular image information are managed by a video management table 214 which is referenced by the video management unit 213.

The video servers 101A, 101B comprise computers equipped with communication functions, and the video management units and the video delivery units are implemented by software programs.

(2) Distribution of Video

Figure 3:
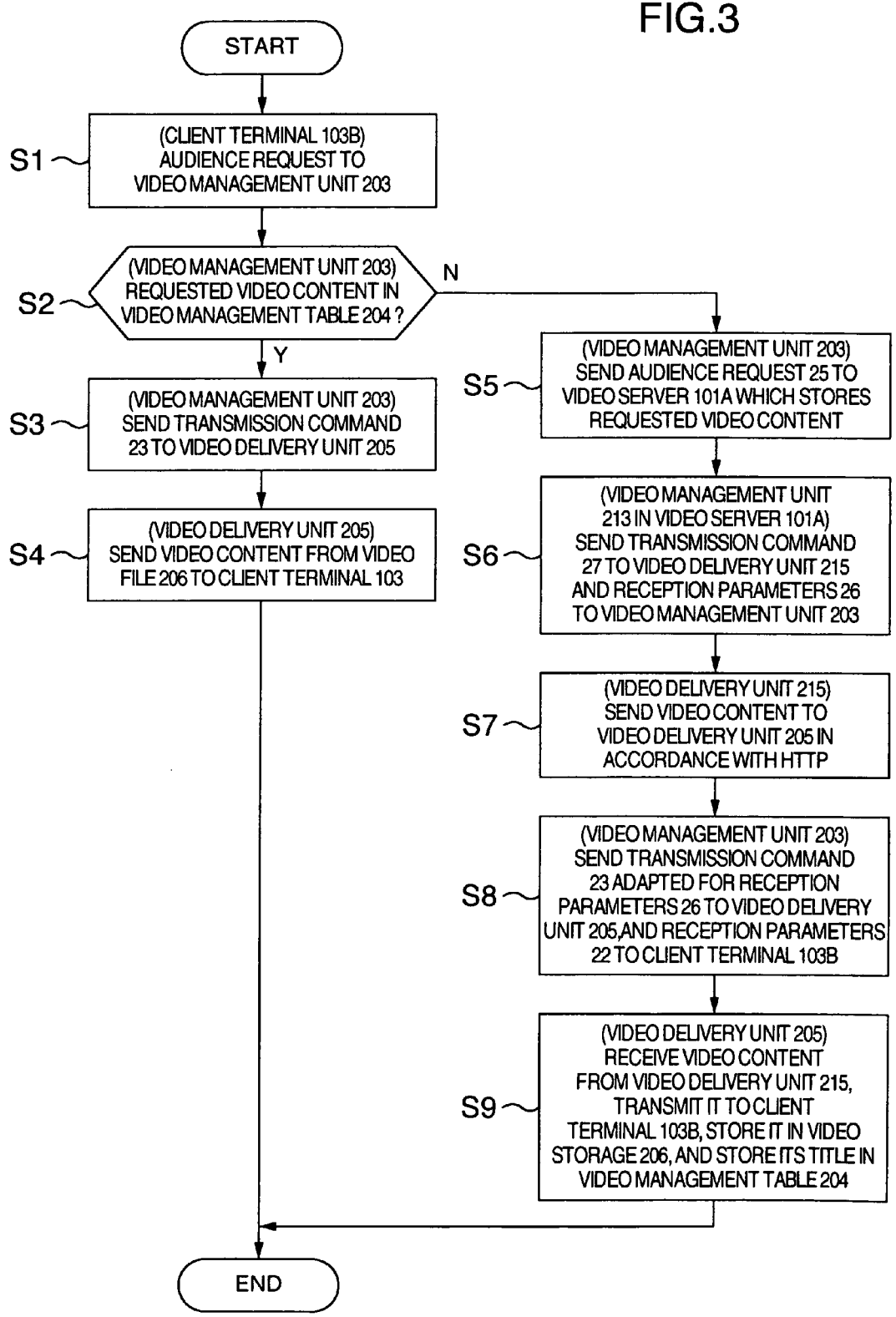
FIG. 3 is a flow chart for explaining the operation of the video server system illustrated in FIG. 2.

FIG. 3 is a flow chart for explaining the operation of the video distribution system illustrated in FIG. 2.

In the following, the operational flow in the video distribution system illustrated in FIG. 2 will be explained along the flow chart of FIG. 3.

Assume that the client terminal 103B issues a video audience request 21 to the video management unit 203 in the video server 101B (step S1). In this event, the video management unit 203 references the video management table 204 to determine whether or not the requested video content is stored in the video storage 206 (step S2), and sends a transmission command 23 to the video delivery unit 205 (step S3) when determining that the video content is stored in the video storage 206 (step S2: Y). In this way, the video delivery unit 205 retrieves the requested video content 24 from the video storage 206 for delivery to the client terminal 103B (step S4). In this event, the video delivery unit 205 may also transmit the video content 24 simultaneously to a plurality of other terminals using the IP multicast as is the case with the client terminal 103B.

On the other hand, when the requested video content is not stored in the video storage 206 (step S2: N), the video management unit 203 sends an audience request 25 to the video management unit 213 in the other video server 101A (step S5). The video server 101B has a list of other video servers which can be connected thereto. The video management unit 213, upon receipt of the audience request 25, references the video management table 214 to determine whether or not the requested video content is stored in the video storage 216. When stored, the video management unit 213 sends a transmission command 27 to the video delivery unit 215, and sends to the video management unit 203 in the video server 101B reception parameters 26 required for receiving the video content from the video delivery unit 215, for example, attribute information such as a video format, compression method, rate, and so on (step S6). Transmission/reception of the audience request and parameters between the video servers are performed in accordance with the HTTP protocol (and may be performed in accordance with any other protocol).

When the requested video content is not stored in the video storage 216, the video server 101B further sends an audience request to another video server within the list. The video server 101B repeats this operation, and returns an error or the like when the requested video content is not stored in any video server.

Turning back to the explanation of the operational flow, the video delivery unit 215, upon receipt of the transmission command 27, uses the HTTP protocol to retrieve image information of interest from the video storage 216 and transmit the retrieved image information to the video delivery unit 205 in the video server 101B in accordance with the transmission command 27 (step S7). Upon receipt of the reception parameters 26, the video management unit 203 sends the transmission command 23 adapted for the parameters 26 to the video delivery unit 205, and transmits to the client terminal 103B reception parameters 22 which are attribute information of the video content required to receive the video content (step S8).

The video delivery unit 205 receives a HTTP-based video content 28 from the video delivery unit 215 in the video server 101A in accordance with the received transmission command 23, and again transmits the video content 28 to the client terminal 103B as image information 24. In this event, the image information received by the video delivery unit 205 is also stored in the video storage 206 for registering its title and so on in the video management table 204 as a cache which is temporary information (step S9).

Subsequently, when an audience request for the same video content is again transmitted from an client terminal, the video management unit 203, at this time, can find the requested video storage registered in the video management table 204 as a cache, sends a transmission command 23 to the video delivery unit 205, retrieves the image information 24 stored in the video storage 206, and transmits the image information 24 to the client terminal 103B (steps S3, S4). In this event, since the image information need not be retrieved and transmitted from the video storage 216 in the video server 101A, a large reduction in the transmission cost can be accomplished.

Figure 4:
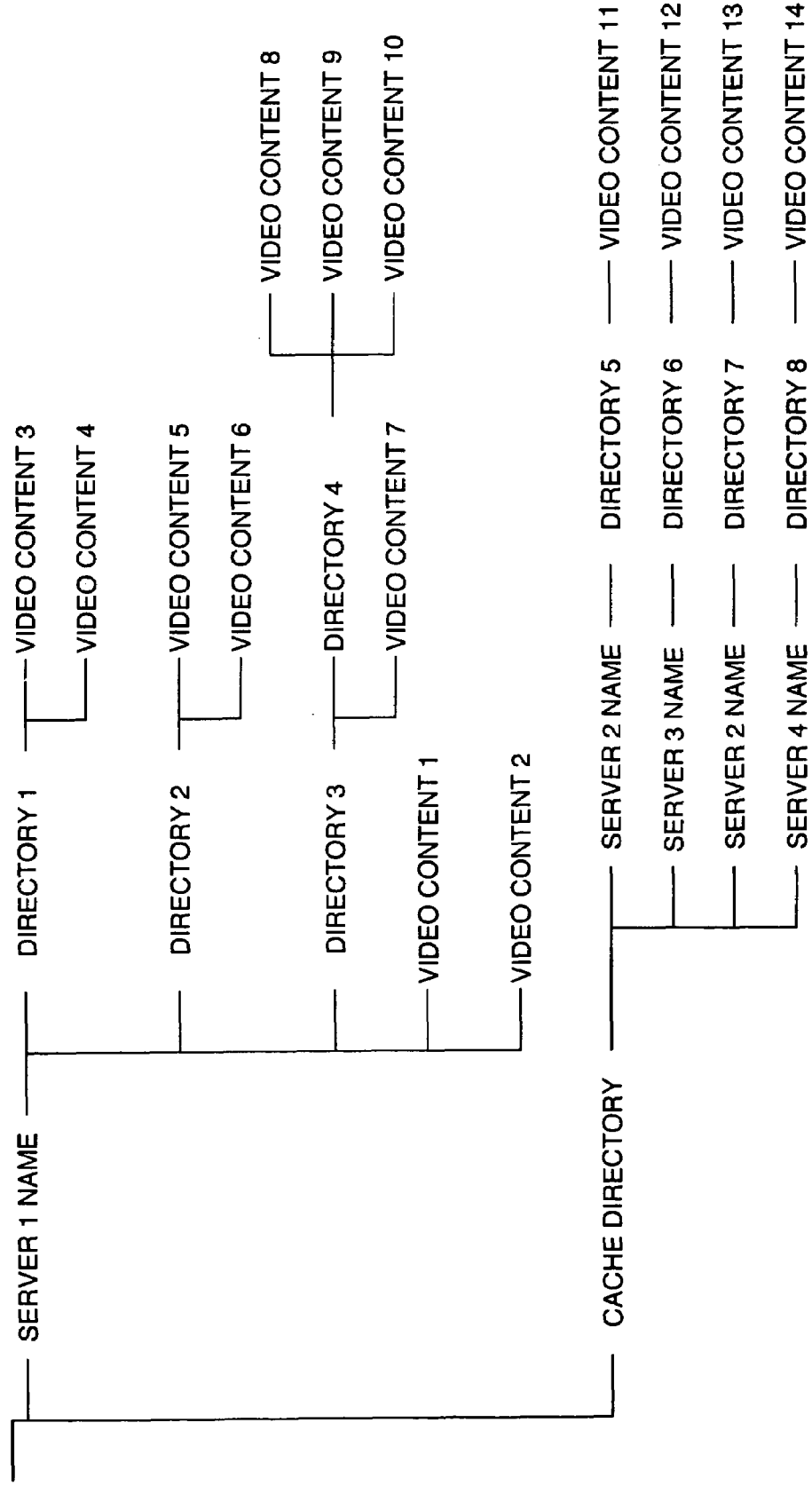
FIG. 4 is a diagram illustrating an example of management information stored in video management tables 204, 214.

FIG. 4 is a diagram illustrating an example of management information stored in the video management tables 204, 214.

In FIG. 4, assume that a server 1 is a video server which holds the video management table, and servers 2, 3, . . . are other video servers. The video management table describes perfect information on video contents stored in the server 1. For video contents stored in the other servers 2, 3, . . . , information on video contents once transmitted in the past is described in a cache directory. An audience request for a video content which is not described in the cache directory is queried sequentially to the other servers as mentioned above. Each video content is managed by a video title (for example, "move 1"), attribute information thereof (the type of the video content, initialization parameters for decoding the video content, dimensions of the vertical side 720 and the horizontal side 480, and so on), the location of the file (for example, a file name such as "video A.movie"), and so on.

The example of FIG. 4 shows that video contents 3, 4 are recorded in a directory 1 of the server 1; video contents 5, 6 in a directory 2; a directory 4 and a video content 7 in a directory 3; video contents 8, 9, 10 in the directory 4; and video contents 1, 2 directly in the server 1. Also, FIG. 4 shows in the cache directory that video contents 11, 12, 13, 14 have been once transmitted from the servers 2, 3, 4, respectively, and stored in the server 1 as caches.

Figure 6:
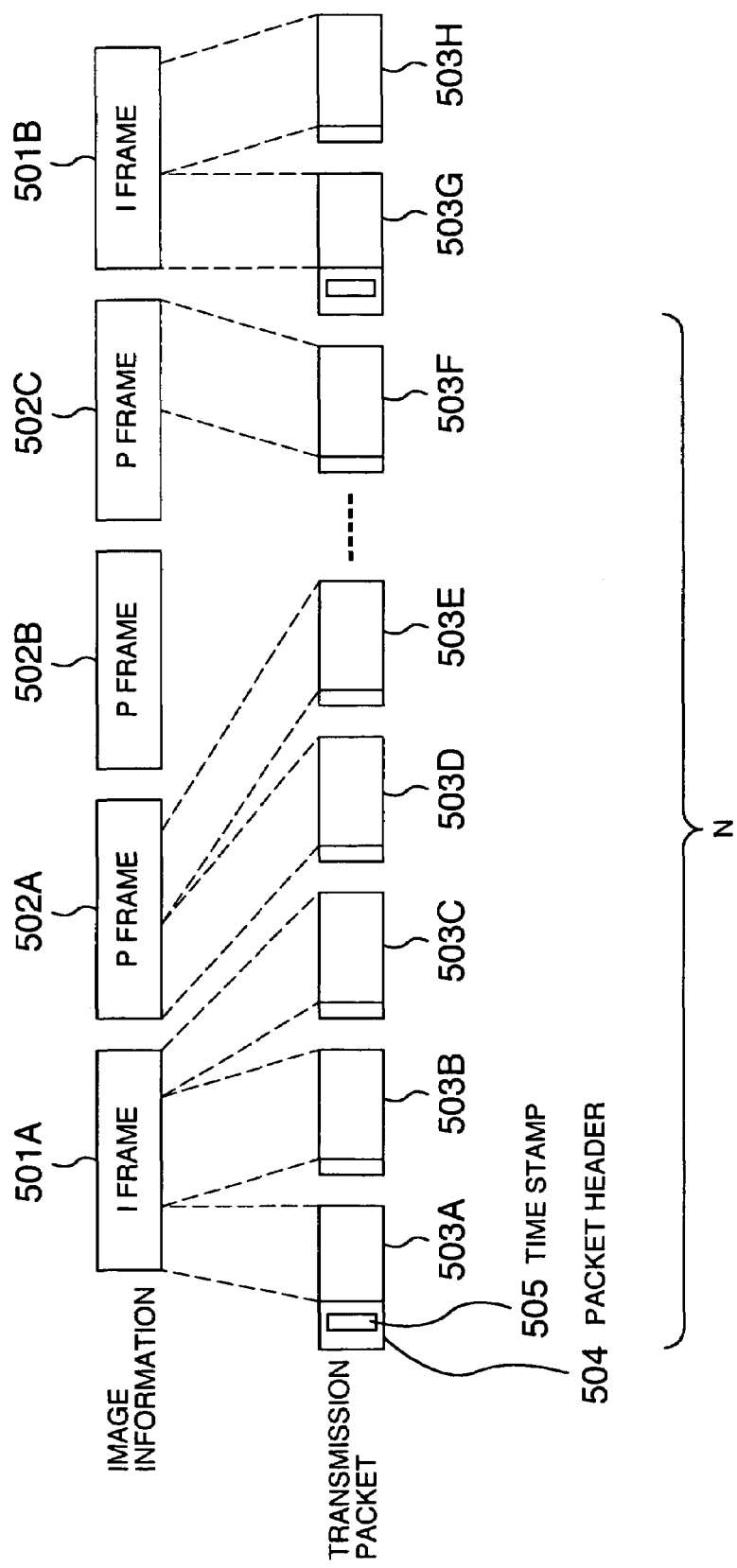
FIG. 6 is a diagram illustrating an exemplary format for image information.

FIG. 6 is a diagram illustrating an exemplary format for the image information in this embodiment.

Since image information is often compression encoded using differential information, it is not always the case that a video content can be restored whichever location the information is decoded from. More frequently, the reproduction of a video content can be started only from a particular point. As an example, FIG. 6 illustrates image information which is compressed using MPEG (Moving Picture Experts Group). A video content can be regarded as a sequence of a plurality of still images.

A plurality of information pieces for still images forming part of a video content are designated 501A, 502A, 502B, 502C, 501B. When the video content is encoded, differential information between one image and the following image is used for encoding a majority of still images 502A, 502B, 502C within this sequence of still images, so that it is difficult to retrieve and decode only such still images. These still images are referred to as "P frames."

On the other hand, some of the still images such as 501A, 501B are encoded independently of previous and following still images such that the video content can be started from these images. These still images are referred to as "I frames." If the video content is decoded from the beginning of a header added to the beginning of codes in an I frame, the video content can be correctly decoded. For this reason, this point is referred to as a "random access point."

The video content is further divided into smaller fragments (packets) 503A, 503B, 503C, 503D, 503E, . . . , 503F, 503G, 503H when it is transmitted. Within these packets, the head packet 503A (503G as well) of the packets comprising an I frame image stores a time stamp 505 which describes a relative time at which the information is reproduced in a packet header 504. Packets included between the head packets of two consecutive I frames, for example, packets 503A–503F in FIG. 6 define a minimum unit for reproducing the video content. When packets are stored in a buffer or the like, they are stored in minimum units N (N is a natural number and variable).

(3) Transmission of Video Content from Video Server to Terminal

Figure 5:
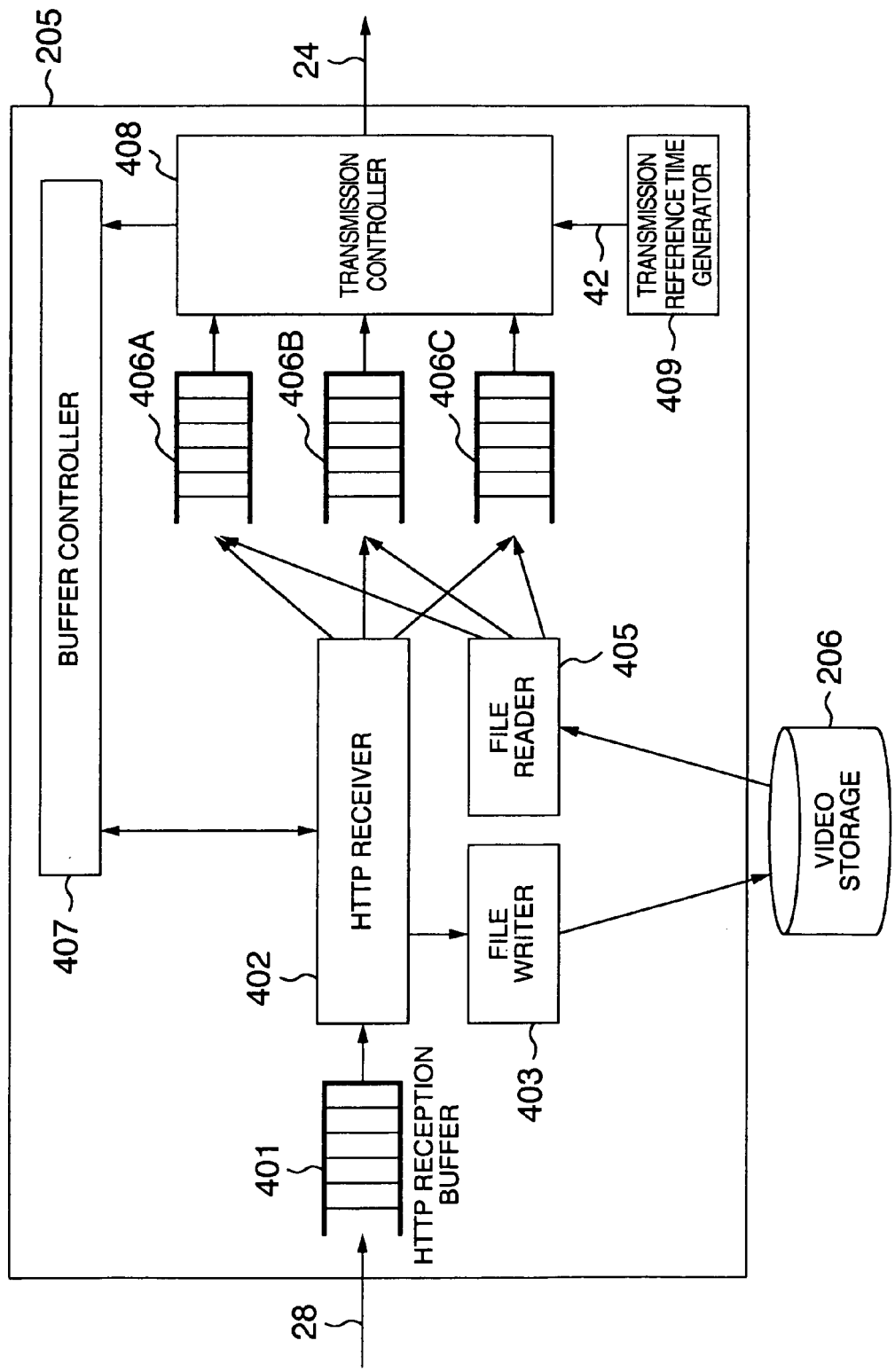
FIG. 5 is a block diagram illustrating an exemplary configuration of a video delivery unit.

FIG. 5 is a block diagram illustrating an exemplary configuration of the video delivery unit.

The video delivery unit illustrated in FIG. 5 corresponds to the video delivery unit 205 in the video server 101B previously described with reference to FIG. 2, and shows a specific configuration for delivering HTTP-based image information transmitted from the other video server 101A to the client terminal 103B.

As illustrated, the video delivery unit comprises an HTTP reception buffer 401; an HTTP receiver 402; a file writer 403; a video storage 404; a file reader 405; speed adjusting buffers 406A–406C; a buffer controller 407; a transmission controller 408; and a transmission reference time generator 409 for generating a reference time for transmission.

In this configuration, image information 28 incoming from another video server (corresponding to the video server 101A in FIG. 2) is temporarily stored in the HTTP reception buffer 401. The HTTP receiver 402 sequentially reads the image information 28 from the HTTP reception buffer 401, examines a packet header to detect a random access point, and stores the image information 28 in the aforementioned minimum units, which allow correct decoding of the video contents, in the speed adjusting buffers 406A, 406B, 406C. While the video delivery unit of this example is provided with three speed adjusting buffers, the same operation principles can be applied if two or more buffers are provided.

It is the buffer controller 407 that manages which image information from the HTTP reception buffer 401 should be stored in which speed adjusting buffer. The buffer controller 407 instructs the HTTP receiver 402 to select the buffer which is not currently used for transmission and into which the preceding image information was written least recently, and to perform a write into the selected buffer. In other words, the three speed adjusting buffers are equally used in order except for that actually in use for transmission.

The transmission controller 408 reads a video content from one of the speed adjusting buffers 406A, 406B, 406C and transmits it to the client terminal as image information 24. In this event, it is again the buffer controller 407 that determines from which speed adjusting buffer the image information is read. The buffer controller 407 selects in order such buffers that are not currently being written and from which the contents have not been read.

The transmission controller 408 reads a time stamp of the image information read from the selected speed adjusting buffer, and compares the time stamp with the reference time 42 received from the transmission reference time generator 409. When the time stamp value is equal to or smaller than the reference time 42, the image information 24 is sent to the terminal through the IP multicast. Once the transmission is completed, the transmission controller 408 dequeues the image information in the buffer. On the other hand, when the time stamp value is larger than the reference time, the transmission controller 408 discards the image information rather than transmitting it to the terminal, and also dequeues the image information from the buffer. In other words, the video controller 408 discards image information exceeding the transmission capability in order to prevent a delay from occurring in course of transmission/reception.

The image information received by the HTTP receiver 402 is sent not only to the speed adjusting buffers but also to the file writer 403 for storage in the video storage 206. Also, when an audience request is sent for image information which has been stored in the video storage 206, the file reader 405, instead of the HTTP receiver 402, reads the requested image information from the video storage 206 and stores it in the speed adjusting buffers 405A, 406B, 406C.

Figure 7:
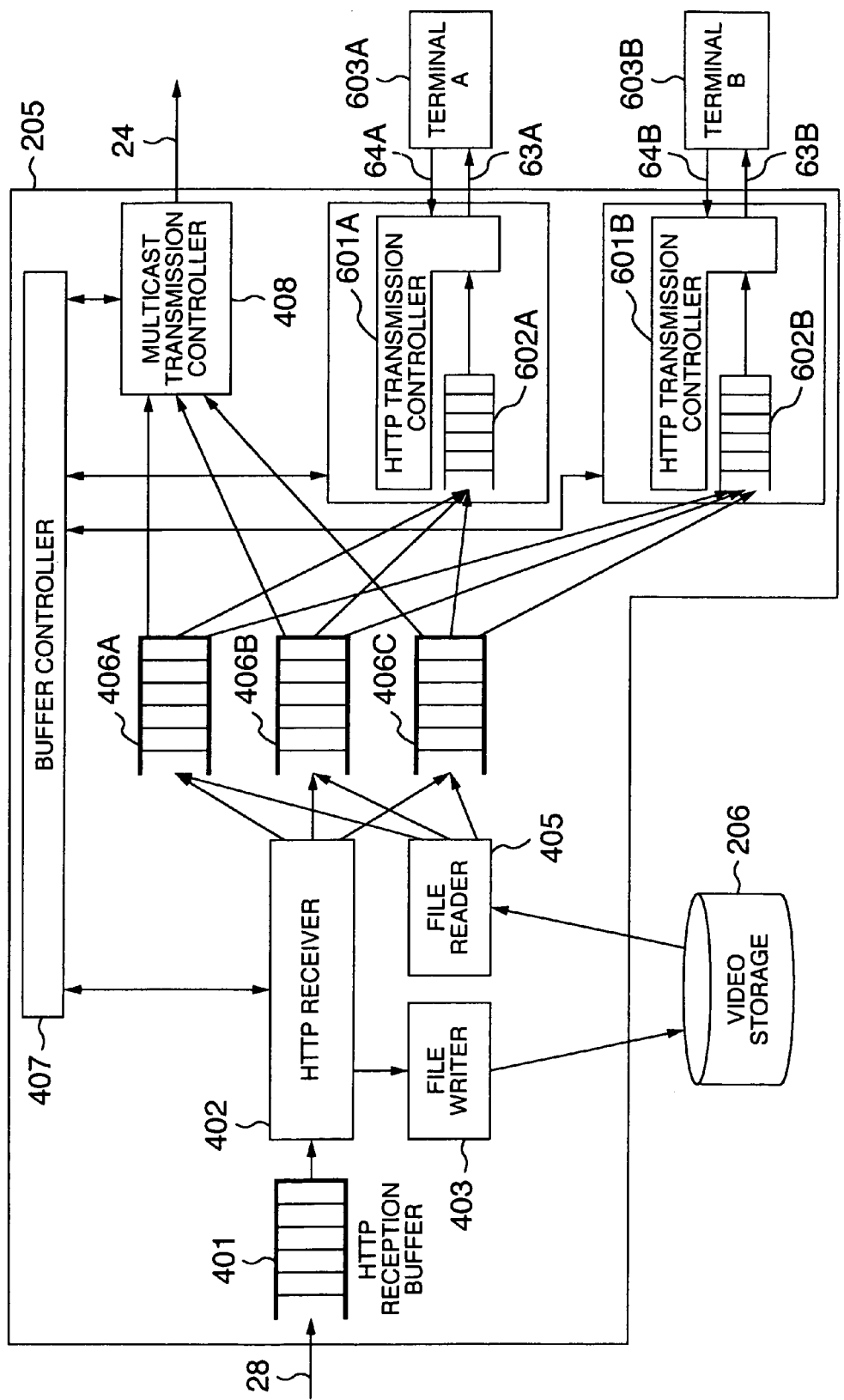
FIG. 7 is a diagram for explaining an example of extended functions for the video delivery unit.

FIG. 7 is a diagram for explaining an example of extended functions for the video delivery unit of the present invention.

In FIG. 7, an HTTP reception buffer 401, an HTTP receiver 402, a file writer 403, a video storage 206, a file reader 405, speed adjusting buffers 406A, 406B, 406C, a buffer controller 407 operate in the same manner as their respective counterparts in FIG. 5. A multicast transmitter 408 operates in the same manner as the transmission controller 408 in FIG. 5.

The embodiment of FIG. 7 includes a transmission function, added to the embodiment of FIG. 5, for transmitting image information to a plurality of client terminals in accordance with the HTTP protocol. Since the HTTP protocol is essentially intended for point-to-point communications, it is not suitable for transmitting the same information simultaneously to a plurality of terminals.

Therefore, this embodiment separately provides HTTP transmission controllers corresponding to a terminal A 603A and a terminal B 603B, respectively. An HTTP transmission controller 601A is responsible for transmission to the terminal A 603A, and has a buffer 602A for temporarily storing information to be transmitted. Similarly, an HTTP transmission controller 601B is responsible for transmission to the terminal B 603B, and has a buffer 602B for temporarily storing information to be transmitted. A similar configuration may be applied for transmitting image information to three or more terminals.

In FIG. 7, the terminal A 603A first transmits a video transmission request 64A in sequence to the HTTP transmission controller 601A. The HTTP transmission controller 601A, upon receipt of the video transmission request 64A, reads information from the buffer 602A for transmission to the terminal A 603A as image information 63A. As the buffer 602A has a free space, the HTTP transmission controller 601A reads image information to be next transmitted from one of the speed adjusting buffers 406A, 406B, 406C, and stores the read image information in the buffer 602A. In this event, it is the buffer controller 407 that determines from which speed adjusting buffer image information is read, as is the case of FIG. 5.

The buffer controller 407 selects a speed adjusting buffer which stores the most recent image information that has not been transmitted to the terminal A 603A, and into which image information is not being written. The buffer controller 407 selects a like speed adjusting buffer for the terminal B 603B. Subsequently, at the time the multicast transmission controller 408 has read and transmitted the contents (image information) of the buffer, the contents of the buffer are deleted.

The HTTP transmission controllers 601A, 601B have the same transmission reference time generator as that designated by 409 in FIG. 5, and transmits image information in the buffers 602A, 602B to a terminal such that no delay occurs.

Figure 8:
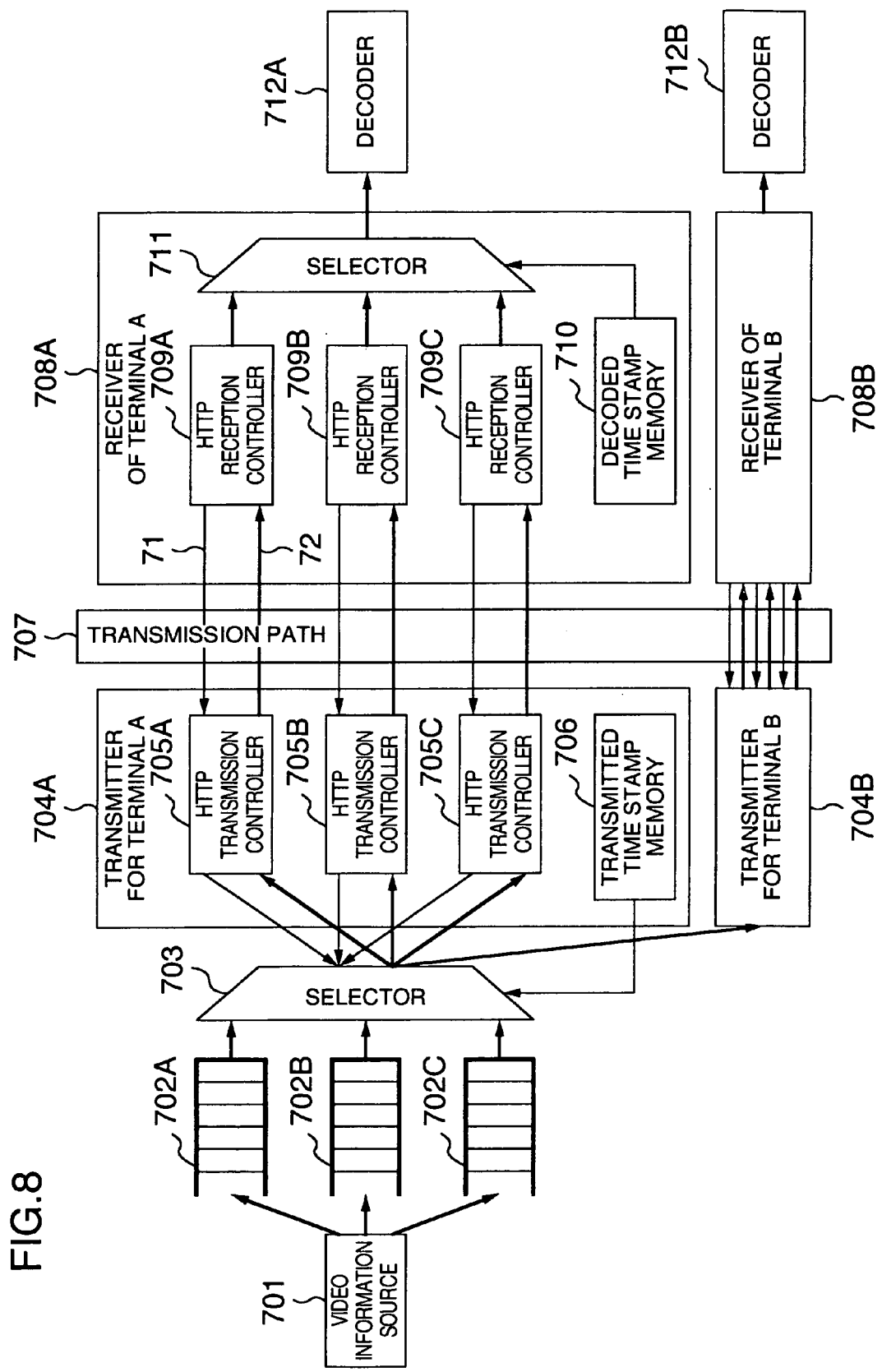
FIG. 8 is a diagram for explaining an exemplary video transmission method according to the HTTP protocol.

FIG. 8 is a diagram for explaining an exemplary video transmission method between a video server and a terminal according to the HTTP protocol.

In this example, one or more HTTP communications are simultaneously performed for improving the utilization efficiency of transmission paths. Specifically, N (N≧2) logical transmission paths are established between a video server and a terminal for use in sending a video content.

Generally, the HTTP protocol involves a procedure in which the transmission side responds to a transmission request from the reception side, so that a transmission path is left unused until a response is returned from the transmission side after the transmission request has been sent from the reception side, thereby causing a lower efficiency. To solve this problem, this embodiment enables a plurality of transmission requests to be issued to a server even for a period from the time the first request has been issued to the time a response is returned.

A video content from a image information source 701 is stored in the speed adjusting buffers 702A, 702B, 702C, in a manner similar to the embodiment of FIG. 5. The video content stored in the speed adjusting buffers 702A, 702B, 702C is overwritten or erased from the oldest one irrespective of whether it has been transmitted or not. A selector 703 selects, in response to a request from a transmitter associated with each terminal, selects a speed adjusting buffer which stores the most recent video content and into which a write is not being executed, from among the speed adjusting buffers 702A, 702B, 702C, and sends the contents of the selected speed adjusting buffer to the transmitter.

A transmitter is provided in correspondence to each reception side for responding to requests from a plurality of transmission sides. For example, a transmitter 704A is provided for a receiver 708A of a terminal A, and a transmitter 704B is provided for a receiver 708B of a terminal B. The transmitter 704A for the terminal A and the receiver 708A of the terminal A are connected over a transmission path 707 through a plurality of independent logical transmission paths in accordance with the HTTP protocol. In this example, three HTTP protocol connections are used. The transmitter 704B for the terminal B and the receiver 708B of the terminal B are also connected in a similar manner.

An HTTP reception controller 709A provided in the receiver 708A of the terminal A transmits a transmission request 71 to the transmitter 705A for the terminal A. As a response to the request, a video content 72 is transmitted from the HTTP transmitter 705A to the HTTP reception controller 709A. Similarly, an HTTP reception controller 709B receives a video content from an HTTP transmission controller 705B, and an HTTP reception controller 709C receives a video content from the HTTP transmission controller 705C.

Each of the HTTP reception controllers 709A, 709B, 709C in the terminal A transmits the next transmission request 71 to the HTTP transmission controller 705A, 705B, 705C associated therewith immediately after it has received the video content. The HTTP transmission controllers 705A, 705B, 705C, upon receipt of the transmission request 71 from the HTTP reception controllers 709A, 709B, 709C associated therewith, each refers to the contents of a transmitted time stamp memory 706 to compare a time stamp of image information of the most recent video fragment transmitted to the terminal A with time stamps of image information stored in the speed adjusting buffers 702A, 702B, 702C. Only when the speed adjusting buffers 702A, 702B or 702C store image information having more recent time stamps than the time stamp of the transmitted video content, a selector 703 selects the most recent video fragment stored in the speed adjusting buffer 702A, 702B or 702C for transmission.

The time stamp of the transmitted image information is stored in the transmitted time stamp memory 706. When the speed adjusting buffers 702A, 702B, 702C do not store image information having a time stamp more recent than the stored time stamp, the transmission is delayed until recent image information is written into the speed adjusting buffers 702A, 702B, 702C.

The respective HTTP reception controllers 709A, 709B, 709C transmit, independently of one another, transmission requests 71 to the HTTP transmission controllers 705A, 705B, 705C associated therewith. Each time the HTTP transmission controllers 705A, 705B, 705C receive the transmission request 71, they merely transmit back the most recent image information at that time as image information 72. Therefore, the image information transmitted back to the HTTP reception controllers 709A, 709B, 709C does not always reach in order. Further, the HTTP reception controllers 709A, 709B, 709C may fail to receive image information due to communication failures or the like.

For the reason set forth above, the image information received at the HTTP reception controllers 709A, 709B, 709C must be sent to a decoder 712A after it is rearranged in correct order. A selector 711 compares a time stamp stored in a decoded time stamp memory 710 with time stamps of the image information which has reached the HTTP reception controllers 709A, 709B, 709C to select the HTTP reception controller which stores the least recent image information except for already decoded image information, and sends the image information stored therein to the decoder 712A.

After the image information is sent to the decoder 712A, the associated HTTP reception controller again sends a transmission request 71 to the HTTP transmission controller. A time stamp of the image information sent to the decoder 712A is stored in the decoded time stamp memory 710. If image information previous to the decoded time stamp reaches any of the HTTP reception controllers 709A, 709B, 709C, the HTTP reception controller stops receiving the image information at that time, discards the image information which has been received, and immediately sends the next transmission request 71.

The operations in the transmitter 704B for the terminal B, the receiver 708B for the terminal B, and a decoder 712B are similar to the foregoing.

As described above, the HTTP protocol based video transmission method using a plurality of logical transmission paths can be applied to video transmission/reception between video servers.

What is claimed is:

1. A video server for distributing a digitized video content, comprising:
   means for determining whether or not a video content requested from a terminal is stored in said video server;
   means for transmitting a transmission request to another video server for transmitting said video content from said another video server when the video content requested by the terminal is not stored in said video server, said transmission request being formatted according to the Hyper Text Transfer Protocol (HTTP); and
   means for receiving the video content transmitted from the other video server, the video content transmitted from the other video server in response to the request being formatted in accordance with the HTTP, and transmitting the video content received from the other video server or as stored in said video server to said terminal, the video content transmitted to said terminal being formatted in accordance with multicast Internet Protocol (IP).

2. A video server according to claim 1, wherein said transmitting means further includes means for transmitting the video content received from the other video server to said terminal in accordance with the HTTP.

3. A video server according to claim 1, further comprising:
   means for storing and managing the video content received from the other video server.

4. A video server according to claim 2, wherein said means for transmitting a video content to the terminal in accordance with the HTTP establishes a plurality of logical transmission paths between said terminal and said video server, and utilizes said plurality of logical transmission paths for transmitting image information.

5. A video server for distributing a digitized video content, comprising:
   means for determining whether or not a video content requested from a terminal is stored in said video server;
   means for transmitting a transmission request to another video server for transmitting said video content in accordance with Hyper Text Transfer Protocol (HTTP) when the video content requested by the terminal is not stored in said video server; and
   means for receiving the video content transmitted from the other video server in accordance with the HTTP, and transmitting the video content to said terminal in accordance with Internet Protocol (IP) multicast,
   wherein said transmitting means includes a plurality of buffers, buffer selecting means, and a reference time generator;
   said transmitting means detects a random access point in image information, and stores the image information up to the next random access point in one of said plurality of buffers; and
   said buffer selecting means selects, from among said plurality of buffers, image information which as not been transmitted and has a time stamp equal to or smaller than a reference time generated by said reference time generator, and indicates the selected image information to said transmitting means.

6. A method of distributing a video content in a video server, comprising the steps of:
   receiving an audience request from a terminal;
   determining whether or not a requested video program is stored in said video server;
   transmitting said video program to the terminal when the requested video program is stored in said video server, the video program transmitted to the terminal being formatted according to the multicast Internet Protocol (IP);
   accessing by sending a request formatted according to the Hyper Text Transfer Protocol (HTTP) to another video server when the requested video program is not stored in said video server to request said other video server to transmit the video program; and
   upon receiving the video program from said other video server, transmitting the received video program to the terminal, the received video program being transmitted to the terminal being formatted according to the multicast IP.

7. A video distribution method according to claim 6, wherein the video program from the other video server is received in accordance with Hyper Text Transfer Protocol (HTTP).

8. A computer program, on a storage medium, for distributing a video from a video server, said computer program when executed causes said video server to perform the steps of:
   receiving an audience request from a terminal;
   determining whether or not a requested video program is stored in said video server;
   transmitting said video program to the terminal when the requested video program is stored in said video server, the video program transmitted to the terminal being formatted according to the multicast Internet Protocol (IP);
   accessing by sending a request formatted according to the Hyper Text Transfer Protocol (HTTP) to another video server when the requested video program is not stored in said video server to request the other video server to transmit the video program; and
   upon receiving the video program from said other video server, transmitting the received video program to the terminal the received video program transmitted to the terminal being formatted according to the multicast IP.

* * * * *